(12) United States Patent
Krantz et al.

(10) Patent No.: US 7,730,399 B2
(45) Date of Patent: Jun. 1, 2010

(54) JOURNAL FILE READER

(75) Inventors: Brigette E. Krantz, Redmond, WA (US); Bryan D. Scott, Bothell, WA (US); Kyril Feldman, Kirkland, WA (US); Reed L. Townsend, Seattle, WA (US); Robert J. Jarrett, Snohomish, WA (US); Steven P. Dodge, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 542 days.

(21) Appl. No.: 11/111,739

(22) Filed: Apr. 22, 2005

(65) Prior Publication Data

US 2006/0242559 A1 Oct. 26, 2006

(51) Int. Cl.
*G06F 17/00* (2006.01)
(52) U.S. Cl. .................. 715/268; 715/234; 715/239; 715/764
(58) Field of Classification Search ............ 715/513, 715/541, 764, 234, 243, 244, 246, 268, 239, 715/276; 382/187, 188
See application file for complete search history.

(56) References Cited

U.S. PATENT DOCUMENTS

| | | | | |
|---|---|---|---|---|
| 6,992,782 | B1 * | 1/2006 | Yardumian et al. | 358/1.13 |
| 7,165,216 | B2 * | 1/2007 | Chidlovskii et al. | 715/237 |
| 7,440,967 | B2 * | 10/2008 | Chidlovskii | 707/102 |
| 2002/0107885 | A1 * | 8/2002 | Brooks et al. | 707/505 |
| 2003/0126556 | A1 * | 7/2003 | Soetarman et al. | 715/513 |
| 2003/0188265 | A1 * | 10/2003 | Tanimoto | 715/513 |
| 2003/0212958 | A1 * | 11/2003 | Altman et al. | 715/517 |
| 2004/0199876 | A1 * | 10/2004 | Ethier et al. | 715/523 |
| 2006/0155700 | A1 * | 7/2006 | Dejean et al. | 707/6 |

OTHER PUBLICATIONS

C. Chesnut,"Converting Journal Notes to XML, SVG, and OneNote,", Mar. 2005, 12 pages, downloaded from <"http://msdn2.microsoft.com/en-us/library/ms812502(d=printer).aspx">.*

L. Masinter,"RFC 2397—The "data" URL scheme," Aug. 1998, 5 pages, downloaded from <"www.faqs.org/rfcs/rfc2397.html">.*

C. Roth,"upCast 5.0 Manual and Reference,", archived Apr. 2, 2004, 130 pages, downloaded from <"http://web.archive.org/web/20040404164601/www.infinity-loop.de/support/documentation/upcast/5.0/manual/index.html">.*

PDFTron, various web pages from archived version of site, archived Jan. 31, 2004, highlighting PDF2SVG file converter application, 16 pages.*

PDFTron, Sample output using selected pages from PDF2SVG Ver. 3.0 manual (PDF page on top with listing of SVG source following), generated with recent Macintosh Version of software to show embedding of bitmaps as Base64, 3 examples.*

Oleg Tkachenko,"Generating Images in WordprocessingML," Dec. 1, 2003, Signs In The Sand Blog, downloaded from <"http://www.tkachenko.com/blog/archives/000106.html">, 10 pages.*

(Continued)

*Primary Examiner*—Doug Hutton
*Assistant Examiner*—James H Blackwell
(74) *Attorney, Agent, or Firm*—Lee & Hayes, PLLC

(57) ABSTRACT

A system and process for enabling programmatic access to the contents of documents containing electronic ink are described.

17 Claims, 10 Drawing Sheets

OTHER PUBLICATIONS

UpCast Version 3.05 Manual, copyright 2000-2002 infinity-loop GmbH, 30 pages.*
W2XML Manual Version 1.0.0, copyright Feb. 22, 2003 Docsoft, 42 pages.*
John E. Simpson, "From Word to XML," Dec. 30, 2003, from XML.com, 9 pages.*
Microsoft Notepad © 2001, Microsoft® Corporation, series of 4 screen dumps, labeled Figures 5-8.*
Microsoft Word 2003 © 2003, Microsoft Corporation, series of 10 screen dumps, labeled Figures 0-4 and 9-13. Note Figure 04 contains 65 pages.*

* cited by examiner

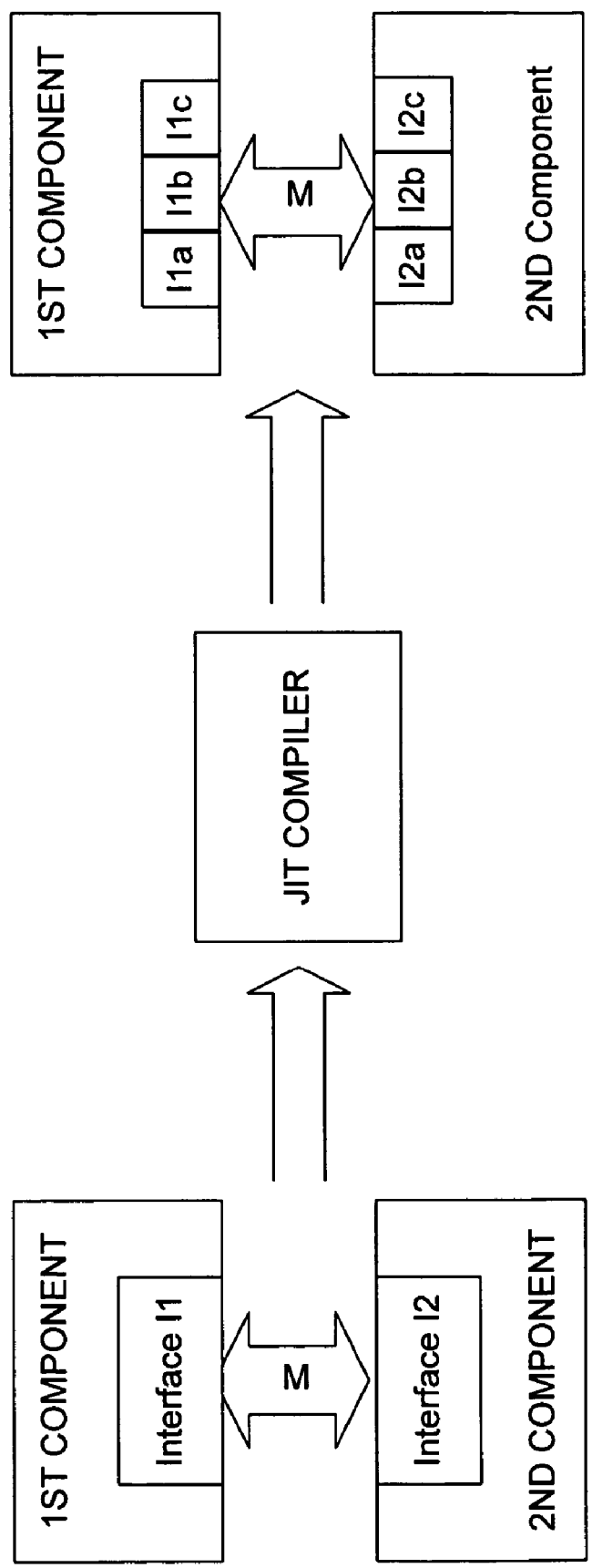

JOURNAL FILE READER

BACKGROUND OF THE INVENTION

1. Field of the Invention

Aspects of the present system relate to computing systems. More particularly, aspects of the present invention relate to enabling programmatic access to the contents of proprietary binary documents, such as those containing electronic ink.

2. Description of the Related Art

In addition to working with text input, computers now have the ability to record and modify electronic ink. Electronic ink may be kept in its native form or may be run through an analyzer to recognize text and annotations. Software applications are integrating the use and analysis of electronic ink into their functionality, enhancing the ability of users to create and edit documents.

Proprietary binary formatted documents may be used by software applications to store some combination of drawings, text, images, and so forth. One such format is a Journal™ document which may be generated by software such as Microsoft's Windows Journal™ software application. Other proprietary binary formats may include Adobe's portable document format (PDF) or Microsoft's PowerPoint file format. Journal documents in particular allow for collecting and arranging of electronic ink alongside drawings, text, images, and so forth. While useful within Microsoft's Journal product, the proprietary and undocumented format of these files may not be easily accessible by other software applications. This may be due to such obstacles as a lack of documentation, or complex compression algorithms built into the format. Software applications, and even individual users, who wish to programmatically access the contents of a Journal document presently find it prohibitively difficult to do so. Software applications are not readily able to examine the contents of these proprietary binary documents.

Methods and systems for enabling programmatic access to the contents of proprietary binary document formats, such as Journal documents are needed.

BRIEF SUMMARY OF THE INVENTION

Aspects of the present invention address one or more of the problems described above, thereby providing a way of enabling programmatic access to the contents of Journal documents.

BRIEF DESCRIPTION OF THE DRAWINGS

The present invention is illustrated, by way of example and not limitation, in the accompanying figures in which like reference numerals indicate the same or similar elements and in which:

FIGS. 1B through 1M illustrate programming interfaces supporting one or more aspects of the present invention;

DETAILED DESCRIPTION OF THE DRAWINGS

Figure 1A:
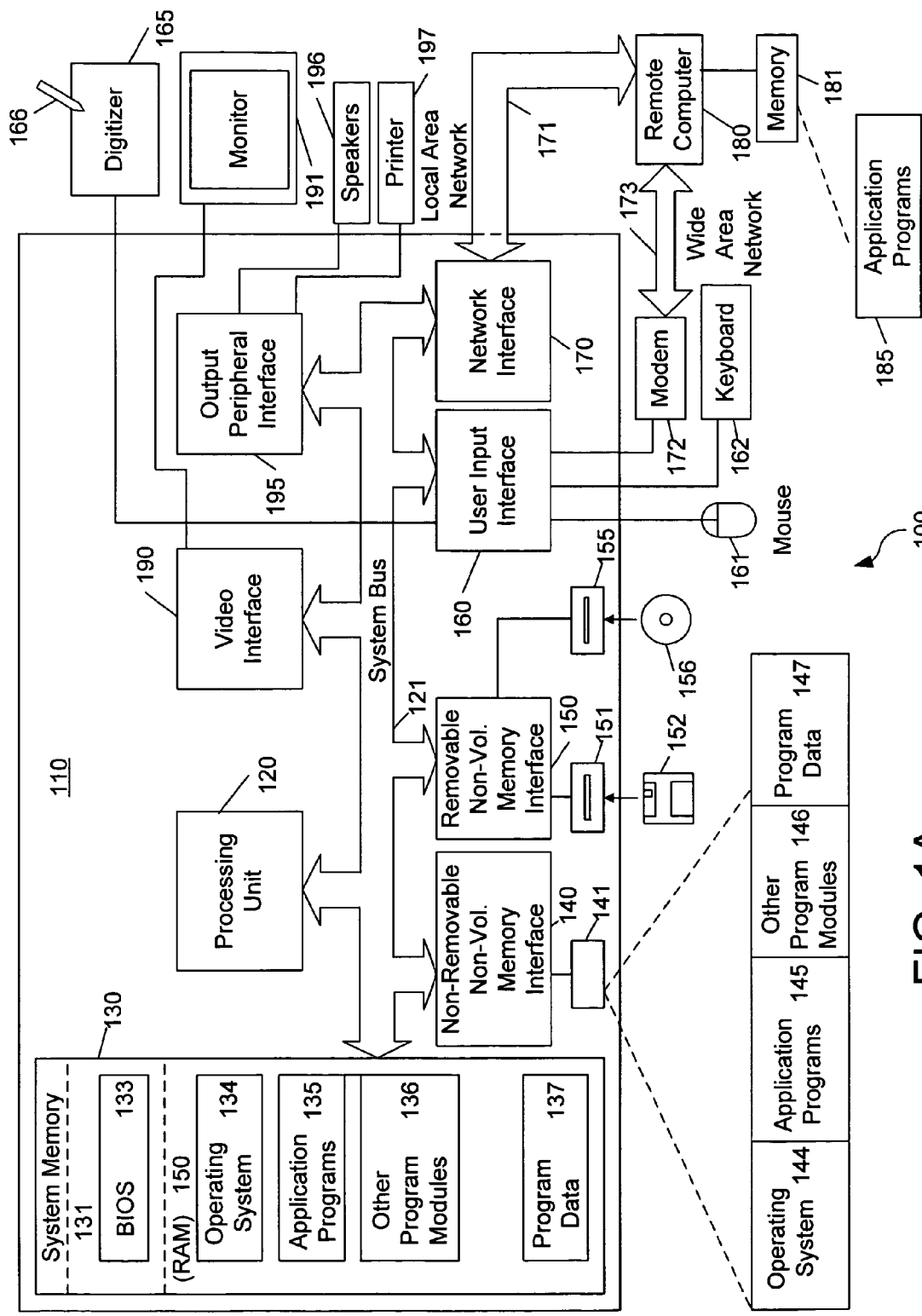
FIG. 1A illustrates a schematic diagram of a general-purpose digital computing environment in which certain aspects of the present invention may be implemented.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

This document is divided into sections to assist the reader. These sections include: an overview, characteristics of ink, terms, general-purpose computing environment, accessing binary documents, and a conclusion.

Overview

According to various embodiments of the invention, proprietary binary documents may contain some combination of text, images, drawings, formatting, and so forth. Journal documents in particular are electronic files which may include electronic ink (e.g., handwriting or drawings), text, images, and so forth. These documents may be created by software applications, such as Microsoft Journal™, on computers which allow for the entry of electronic ink (e.g., a tablet PC with a touch sensitive display, or a PC with a mouse or drawing tablet attached). The electronic files which store these documents may include Journal documents having a file extension of .jnt or .jtp, or other extensions.

Software developers and individual users may wish to programmatically access the contents of these proprietary binary documents. For example, a user may wish to extract all of her own handwriting (i.e., electronic ink) from one or more Journal documents. Alternatively, a desktop search agent may wish to access the textual contents of one or more Journal documents, including text recognized from electronic ink, in order to index the contents of the file(s). Aspects of the invention provide a facility for accomplishing these goals.

Characteristics of Ink

As known to users of pens, markers, crayons, pencils, and other marking implements, physical ink (the kind laid down on paper using pen and ink or other writing and drawing implements) may convey more information than a series of coordinates connected by line segments. For example, physical ink can reflect pen pressure (by the thickness of the ink), pen angle (by the shape of the line or curve segments and the behavior of the ink around discreet points), and the speed of the nib of the pen (by the straightness, line width, and line width changes over the course of a line or curve). Further examples include the way ink is absorbed into the fibers of paper or other surface it is deposited on. These subtle characteristics also aid in conveying the above listed properties. Because of these additional properties, emotion, personality, emphasis and so forth can be more instantaneously conveyed than with uniform line width between points.

Electronic ink (or ink) relates to the capture and display of electronic information captured when a user uses a stylus-based input device. Electronic ink refers to a sequence or any arbitrary collection of strokes, where each stroke is comprised of a sequence of points. The strokes may have been drawn or collected at the same time or may have been drawn or collected at independent times and locations and for independent reasons. The points may be represented using a variety of known techniques including Cartesian coordinates (X, Y), polar coordinates (r, θ), and other techniques as known in the art. Electronic ink may include representations of properties of real ink including pressure, angle, speed, color, stylus size, and ink opacity. Electronic ink may further include other properties including the order of how ink was deposited on a page (a raster pattern of left to right then down for most western languages), a timestamp (indicating when the ink was deposited), indication of the author of the ink, and the originating device (at least one of an identification of a machine upon which the ink was drawn or an identification of the pen used to deposit the ink) among other information. Among the characteristics described above, the temporal order of strokes and a stroke being a series of coordinates may primarily be used.

Electronic ink may be submitted for analysis and recognition. Ink representing words and paragraphs may be analyzed in order to determine what words are intended. In analyzing ink, alternative recognition solutions may arise. For example, a person may handwrite the word "theme," but an ink analyzer may not be sure if the ink represents the single word "theme" or the words "the me" depending on the person's handwriting. As such, an ink analyzer may use rules of grammar, the context of other nearby words, and other factors to infer a more correct analysis. In so doing, the ink may store a list of alternate words which were not selected along with the binary ink information.

Terms

| Term | Definition |
| --- | --- |
| Ink | A sequence or set of strokes with properties. A sequence of strokes may include strokes in an ordered form. The sequence may be ordered by the time captured or by where the strokes appear on a page or in collaborative situations by the author of the ink. Other orders are possible. A set of strokes may include sequences of strokes or unordered strokes or any combination thereof. Further, some properties may be unique to each stroke or point in the stroke (for example, pressure, speed, angle, and the like). These properties may be stored at the stroke or point level, and not at the ink level. |
| Ink object | A data structure storing ink with or without properties. |
| Stroke | A sequence or set of captured points. For example, when rendered, the sequence of points may be connected with lines. Alternatively, the stroke may be represented as a point and a vector in the direction of the next point. In short, a stroke is intended to encompass any representation of points or segments relating to ink, irrespective of the underlying representation of points and/or what connects the points. |
| Document | Any electronic file that has a viewable representation and content. A document may include a web page, a word processing document, a note page or pad, a spreadsheet, a visual presentation, a database record, a form, image files, and combinations thereof. |
| Document Object Model | Any structure for representing a collection of data which is meaningful to the software application using it. A document object model may include a tree of context node, a database table, an XML document, an array of objects in memory, and so forth. A document object model may be used to store the contents of a document, render a document to a display device, sort the contents of the document, etc. |

-continued

| Term | Definition |
| --- | --- |
| Render, Rendered, or Rendering | The process of determining how information (including text, graphics, and/or electronic ink) is to be displayed, whether on a screen, printed, or output in some other manner. |
| Computer-readable medium | Any available media that can be accessed by a user on a computer system. By way of example, and not limitation, "computer-readable media" may include computer storage media and communication media. |
| Computer storage media | Includes volatile and nonvolatile, removable and non-removable media implemented in any method or technology for storage of information, such as computer-readable instructions, data structures, program modules or other data. "Computer storage media" includes, but is not limited to, RAM, ROM, EEPROM, flash memory or other memory technology; CD-ROM, digital versatile disks (DVD) or other optical storage devices; magnetic cassettes, magnetic tape, magnetic disk storage or other magnetic storage devices; or any other medium that can be used to store the desired information and that can be accessed by a computer. |
| Communication media | Typically embodies computer-readable instructions, data structures, program modules or other data in a modulated data signal, such as a carrier wave or other transport mechanism, and includes any information delivery media. |
| Modulated data signal | A signal that has one or more of its characteristics set or changed in such a manner as to encode information in the signal. By way of example, and not limitation, communication media includes wired media, such as a wired network or direct-wired connection, and wireless media, such as acoustic, RF, infrared and other wireless media. Combinations of any of the above should also be included within the scope of "computer-readable media." |

General-Purpose Computing Environment

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, and removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181.

It will be appreciated that the network connections shown are exemplary and other means of establishing a communications link between the computers may be used.

In some aspects, a pen digitizer 165 and accompanying pen or stylus 166 are provided in order to digitally capture freehand input. Pen digitizer 165 may further use capacitive or resistive technologies enabling an active stylus or a passive stylus (e.g., a finger or other pointing device). Although a direct connection between the pen digitizer 165 and the user input interface 160 is shown, in practice, the pen digitizer 165 may be coupled to the processing unit 110 directly, parallel port or other interface and the system bus 130 by any technique including wirelessly. Also, the pen 166 may have a camera associated with it and a transceiver for wirelessly transmitting image information captured by the camera to an interface interacting with bus 130. Further, the pen may have other sensing systems in addition to or in place of the camera for determining strokes of electronic ink including accelerometers, magnetometers, and gyroscopes.

It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 1C:
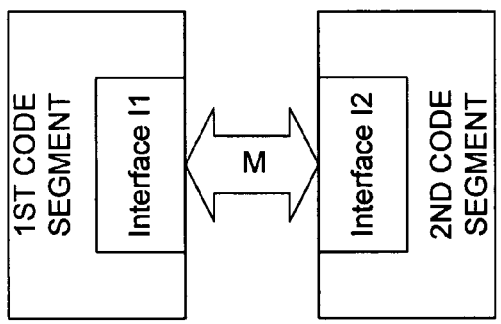
Figure 1E:
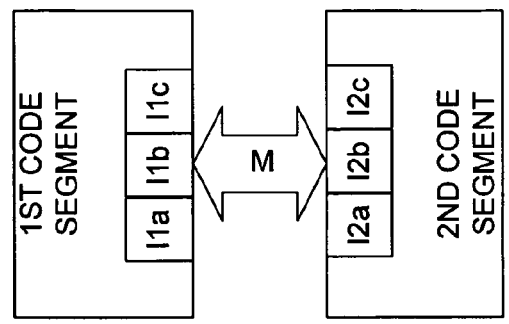
Figure 1B:
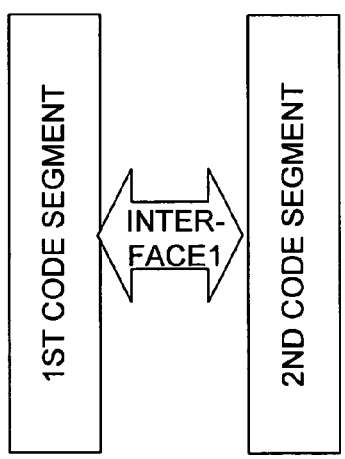

Notionally, a programming interface may be viewed generically, as shown in FIG. 1B or FIG. 1C. FIG. 1B illustrates an interface Interface1 as a conduit through which first and second code segments communicate. FIG. 1C illustrates an interface as comprising interface objects I1 and I2 (which may or may not be part of the first and second code segments), which enable first and second code segments of a system to communicate via medium M. In the view of FIG. 1C, one may consider interface objects I1 and I2 as separate interfaces of the same system and one may also consider that objects I1 and I2 plus medium M comprise the interface. Although FIGS. 1B and 1C show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 1B and 1C, but they nonetheless perform a similar function to accomplish the same overall result. We will now briefly describe some illustrative alternative implementations of a programming interface.

A. Factoring

Figure 1D:
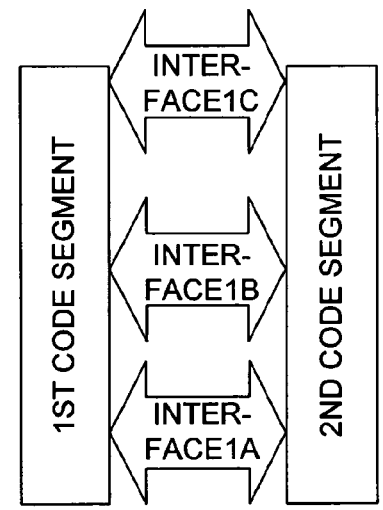

A communication from one code segment to another may be accomplished indirectly by breaking the communication into multiple discrete communications. This is depicted schematically in FIGS. 1D and 1E. As shown, some interfaces can be described in terms of divisible sets of functionality. Thus, the interface functionality of FIGS. 1B and 1C may be factored to achieve the same result, just as one may mathematically provide 24, or 2 times 2 times 3 times 2. Accordingly, as illustrated in FIG. 1D, the function provided by interface Interface1 may be subdivided to convert the communications of the interface into multiple interfaces Interface1A, Interface1B, Interface1C, etc. while achieving the same result. As illustrated in FIG. 1E, the function provided by interface I1 may be subdivided into multiple interfaces I1$a$, I1$b$, I1$c$, etc. while achieving the same result. Similarly, interface I2 of the second code segment which receives information from the first code segment may be factored into multiple interfaces I2$a$, I2$b$, I2$c$, etc. When factoring, the number of interfaces included with the 1st code segment need not match the number of interfaces included with the 2nd code segment. In either of the cases of FIGS. 1D and 1E, the functional spirit of interfaces Interface1 and I1 remain the same as with FIGS. 1B and 1C, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 1F:
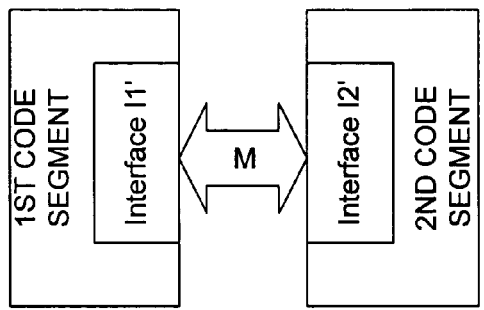
Figure 1G:
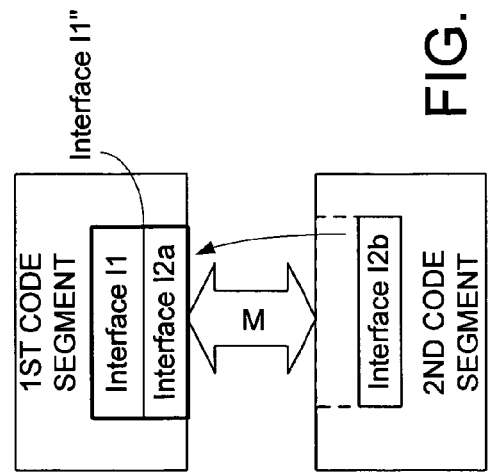

In some cases, it may be possible to ignore, add or redefine certain aspects (e.g., parameters) of a programming interface while still accomplishing the intended result. This is illustrated in FIGS. 1F and 1G. For example, assume interface Interface1 of FIG. 1B includes a function call Square (input, precision, output), a call that includes three parameters, input, precision and output, and which is issued from the 1st Code Segment to the 2nd Code Segment. If the middle parameter precision is of no concern in a given scenario, as shown in FIG. 1F, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 1G, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, which are not needed for some purpose, and so they may be ignored or redefined, or processed elsewhere for other purposes.

C. Inline Coding

Figure 1H:
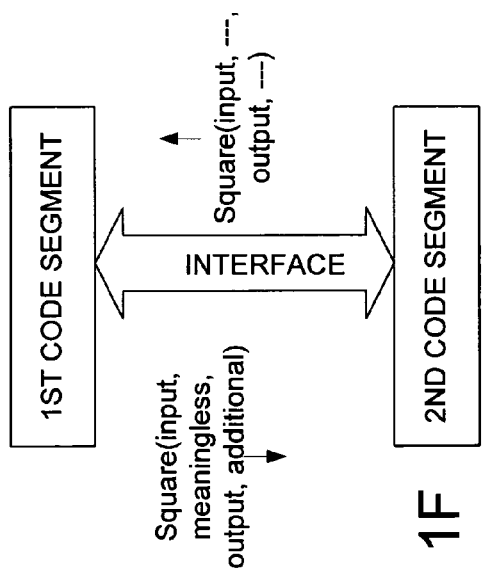
Figure 1I:
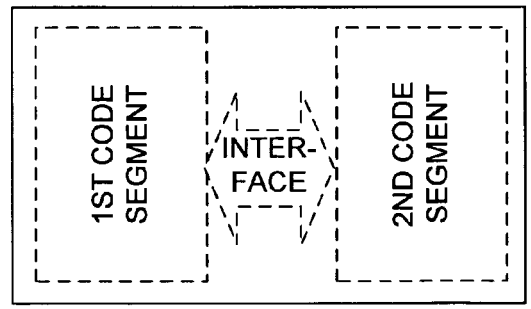

It may also be feasible to merge some or all of the functionality of two separate code modules such that the "interface" between them changes form. For example, the functionality of FIGS. 1B and 1C may be converted to the functionality of FIGS. 1H and 1I, respectively. In FIG. 1H, the previous 1st and 2nd Code Segments of FIG. 1B are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 1I, part (or all) of interface I2 from FIG. 1C may be written inline into interface I1 to form interface I1". As illustrated, interface I2 is divided into I2a and I2b, and interface portion I2a has been coded in-line with interface I1 to form interface I1". For a concrete example, consider that the interface I1 from FIG. 1C performs a function call square (input, output), which is received by interface I2, which after processing the value passed with input (to calculate the square of an input) by the second code segment, passes back the squared result with output. In such a case, the processing performed by the second code segment (squaring input) can be performed by the first code segment without a call to the interface.

D. Divorce

Figure 1K:
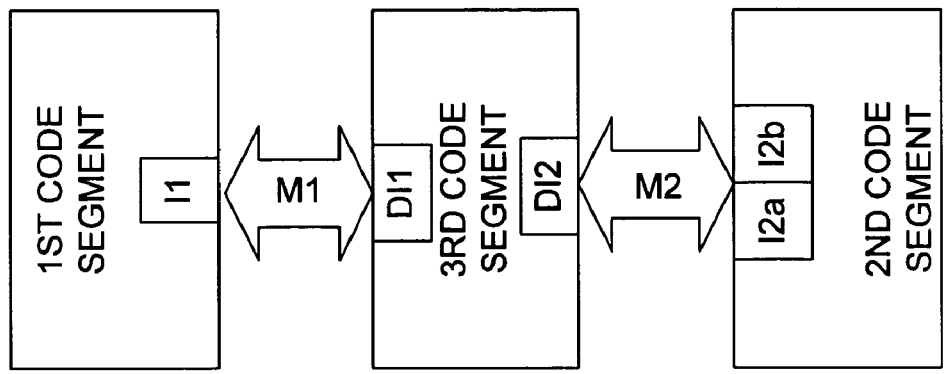
Figure 1J:
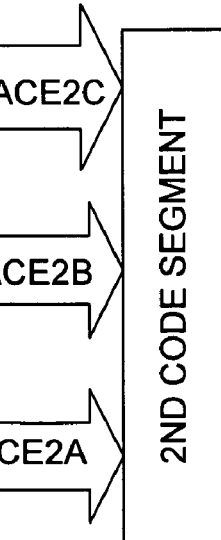

A communication from one code segment to another may be accomplished indirectly by breaking the communication into multiple discrete communications. This is depicted schematically in FIGS. 1J and 1K. As shown in FIG. 1J, one or more piece(s) of code (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the 2nd Code Segment is changed such that it is no longer compatible with the interface used by the 1st Code Segment, and so an intermediary is used to make the old and new interfaces compatible. Similarly, as shown in FIG. 1K, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 1C to a new operating system, while providing the same or similar functional result.

E. Rewriting

Figure 1L:
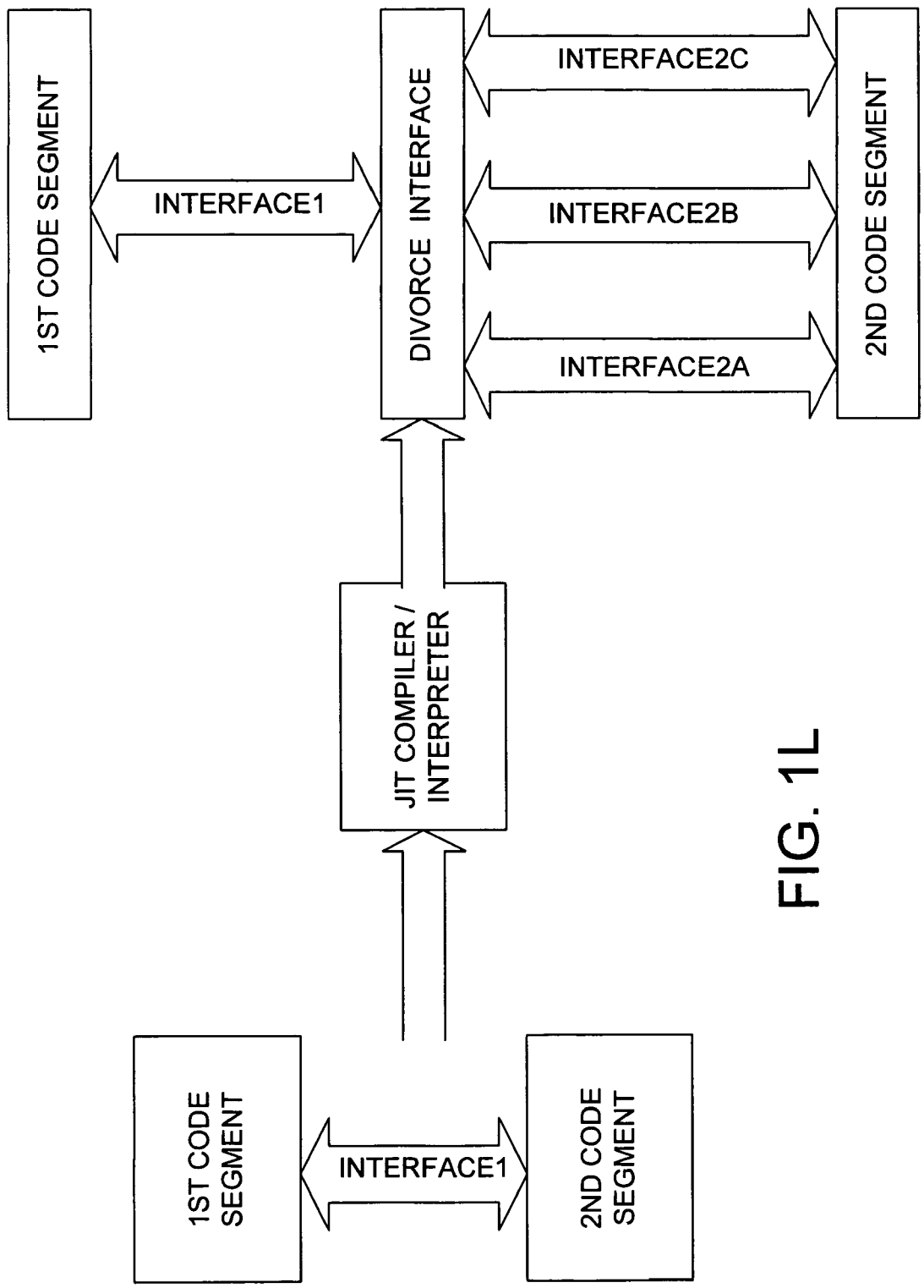

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the .Net framework, the Java runtime environment, or other similar runtime type environments). The JIT compiler may be written so as to dynamically convert the communications from the 1st Code Segment to the 2nd Code Segment, i.e., to conform them to a different interface as may be required by the 2nd Code Segment (either the original or a different 2nd Code Segment). This is depicted in FIGS. 1L and 1M. As can be seen in FIG. 1L, this approach is similar to the Divorce scenario described above. It might be done, e.g., where an installed base of applications are designed to communicate with an operating system in accordance with an Interface1 protocol, but then the operating system is changed to use a different interface. The JIT Compiler could be used to conform the communications on the fly from the installed-base applications to the new interface of the operating system. As depicted in FIG. 1M, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 1B and 1C. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

Accessing Journal Documents

Figure 2:
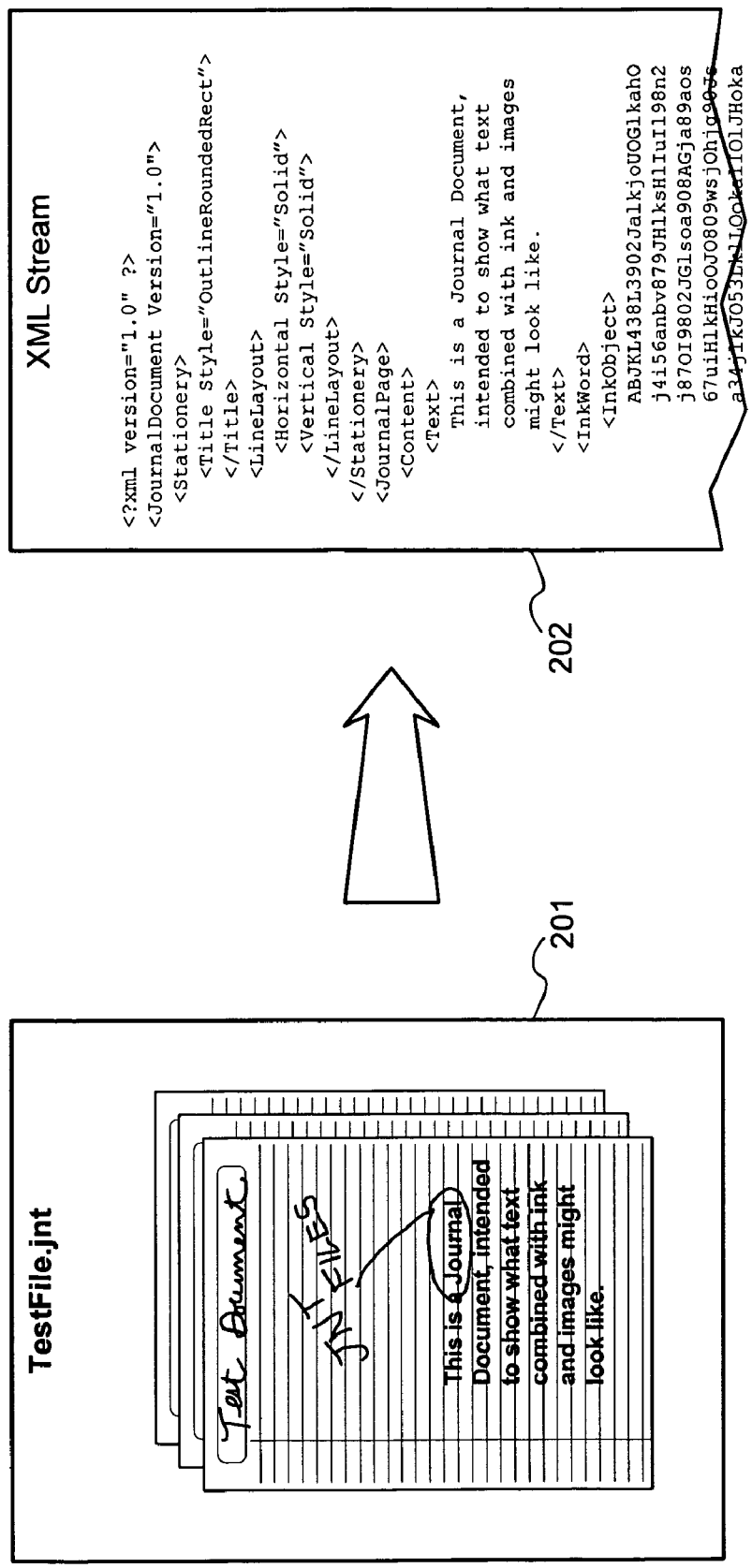
FIG. 2 depicts an illustrative example of enabling access to the contents of a proprietary binary document in accordance with aspects of the present invention.

FIG. 2 depicts an illustrative example of enabling access to the contents of a proprietary binary document 201 (e.g., a Journal document) in accordance with aspects of the present invention. The contents of proprietary binary document 201 may include electronic ink (e.g., handwriting, drawings, annotations, etc.), text, images, stationery, and so forth. These various elements may be stored within Journal document 201 using a proprietary format, standards for which are unavailable to users and software developers. For example, proprietary binary document 201 may be saved as the file "TestFile.jnt."

Aspects of the invention provide for a programmatic method for accessing the contents of proprietary binary document 201. This programmatic method may include providing a model of proprietary binary document 201 in a standardized fashion, such as extensible markup language (XML), as depicted in FIG. 2. Alternatively, the programmatic method may comprise providing an application programming interface, exposing a model of proprietary binary document 201 as readable objects or interfaces. Tags and objects exposed by the methods and systems described herein are by way of example. Other tags, objects, interfaces, attributes, and so forth may be added without changing the underlying spirit of the invention.

Proprietary binary document 201, here, is converted to an XML stream 202 conforming to standards used for the interchange of information. XML provides a flexible architecture for information interchange between and among computers, applications, and users. Each of the components contained within proprietary binary document 201 (e.g., electronic ink, text, stationery, and so forth) are converted into textual "tags" which are delivered in structured fashion. Although not every aspect of proprietary binary document 201 may be provided in the XML tags, enough information is provided to either reconstruct the layout of the document, or at least access the information contained therein.

Figure 3:
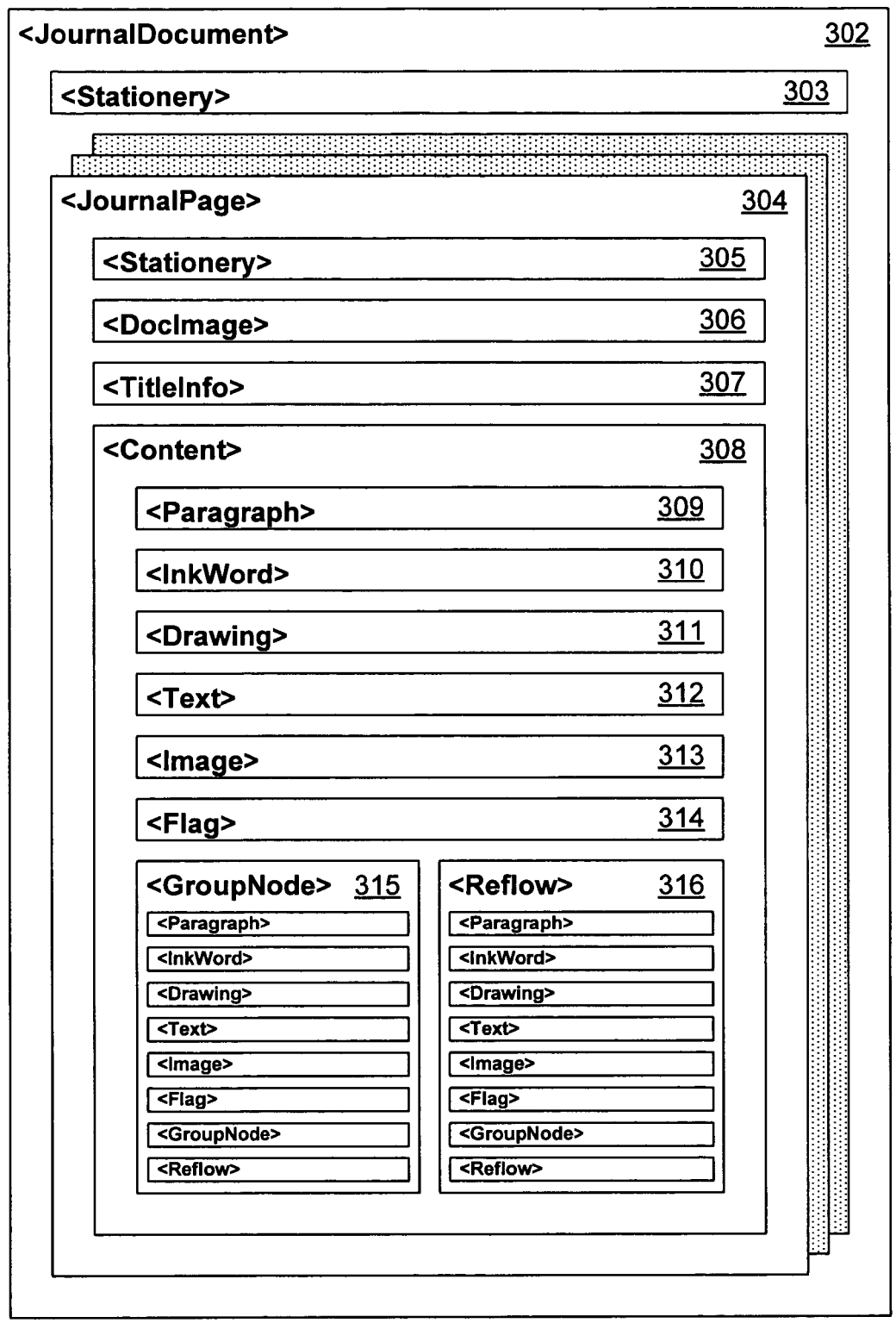
FIG. 3 illustrates an extensible markup language (XML) schema in accordance with aspects of the present invention.

FIG. 3 illustrates an extensible markup language (XML) schema 301 in accordance with aspects of the present invention. XML schema 301 may generally be used to provide a structure or guideline for generating XML stream 202. XML schemas generally help to define a set of meaningful XML tags, their attributes, and the relationships among tags of various types. The tags set forth in schema 301 represent merely one way of breaking down the contents and structure of proprietary binary document 201. Other schema may be available which accomplish the same goal of providing a standardized structure for communicating the contents of documents such as a Journal documents.

XML schema 301 depicted in FIG. 3 shows how the containment of tags within tags may be structured when creating XML stream 202. When a first tag is visually contained within a second tag in FIG. 3, instances of the first tag may appear contained within instances of the second tag in XML stream 202. XML documents are typically created using only textual characters, and as such have no particular means for conveying binary information, such as the contents of an image or ink object. As such, binary data may be conveyed in an XML document by converting the binary information to text using an encoding scheme, such as base64.

When creating XML stream 202, the outermost XML tag may be JournalDocument 302, which includes attributes, possibly including document version, schema version, default page width, default page height, and so forth. Contained within JournalDocument 302, there may be Stationery 303, which provides default stationery settings for pages within a Journal document. Stationery 303 may include attributes such as a background images and/or colors, title display region information, and location and style of rule lines.

In addition to Stationery 303, JournalDocument 302 may include one or more JournalPages 304. Each JournalPage 304 tag represents a page within a Journal document. JournalPage 304 may include attributes including page number, and page width and height. Within a JournalPage 304, contained tags may include Stationery 305, DocImage 306, TitleInfo 307, and Content 308. Stationery 305 is virtually identical in structure to Stationery 303, except that its attributes apply merely to the specific journal page rather than to the whole document as a default.

DocImage 306 may supply information about an image underlying a page within a Journal document. For example, a page within Journal document 201 may include a matched pair of background image and document metadata. Such combinations of background image and metadata may be generated by software acting as a print driver, such that an image of a printed page (e.g., an agenda or a presentation slide) can be automatically captured and inserted into a Journal document, where it can be annotated by a user. DocImage 306 provides a tag for conveying such underlying images. The binary contents of the images may be conveyed within this tag using an encoding scheme such as base64. TitleInfo 307 may include attributes such as title text, as well as a date and time for the page. Finally, Content 308 tag provides a collection of tags embodying the remaining content of a page in within a Journal document.

Within Content 308, a sequential collection of element tags provide information on each of the different types of content which may be displayed on a page. Many of the elements within Content 308 include location and bounding information, including a top coordinate, a left coordinate, a height, and a width. In addition, many of the content elements may also include scalar transform information describing how the element or group of elements has been resized, rotated, moved, or otherwise modified.

Paragraph 309 may contain information about a block of handwritten electronic ink. Paragraph 309 may include other tags within it, tags which break down the ink into lines and words. If the ink has been analyzed and recognized as words, then embedded within these tags, there may be additional recognition information. This may include a list of recognition alternatives, confidence levels, and so forth. Binary ink objects included with the paragraph (e.g., stroke data) may be included as base64 encoded text. Similarly, InkWord 310 may be included as free standing words within Content 308, or embedded within Paragraph 309. InkWord 310 may also include base64-encoded ink objects, alternate lists, and so forth.

Drawing 311 tags may also be included within Content 308, representing electronic ink sketches and drawings. The ink object or objects which make up a drawing may be encoded, as above, as base64 text. Text 312 tags may be included within Content 308, providing the content of text entered onto a page of JournalPage 304. Image 313 tags may provide access to any inserted pictures or images, providing the binary content of these inserted items using base64 encoding (or another encoding scheme). Flag 314 tags provide information about flags inserted into a Journal document, recognizing such useful elements as to do items.

The last two element tags which may be embedded within Content 308 are actually collections of elements. GroupNode 315 tags provide information about elements which are grouped together, and may include any of the described content elements, including other GroupNodes. Reflow 316 tags work similarly, allowing for the embedding of other elements, including other Reflow tags. Reflow 316 may be useful for handling the repositioning of content along page breaks.

A user or software application invoking a conversion of proprietary binary document 201 into XML stream 202 may receive an XML document which has been built and possibly validated against a schema such as XML schema 301. With XML stream 202, the user or software application is able to access an entirely textual form of the document. Using an XML parser, or by merely traversing the tags and text, a software application may be able to selectively access the text, ink, images, and so forth. This information may be used for searching or for creating new documents usable by other programs.

As stated above, additional aspects of the invention may provide access to the contents of proprietary binary document 201 using document models other than XML. Other standard or non-standard textual representations may be available. Additionally, the information contained in proprietary binary document 201 may be provided in one or more database tables. As stated above, other methods of enabling access to the content of proprietary binary document 201 known to those of skill in the art may also be available.

Figure 4:
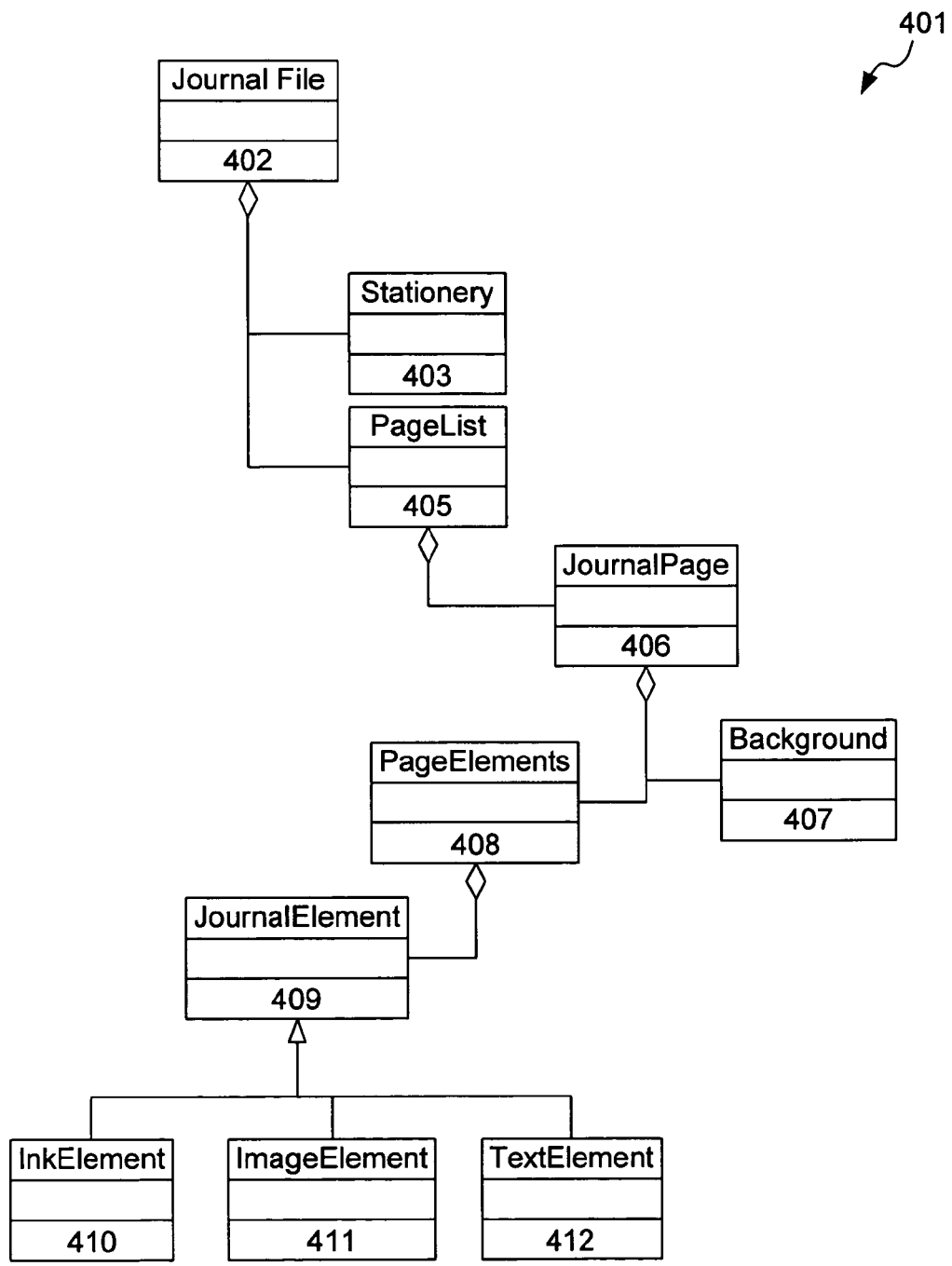
FIG. 4 illustrates a class diagram in accordance with aspects of the present invention.

The content of proprietary binary document 201 may alternatively be provided as a collection of objects using a common interface standard (e.g., Component Object Model (COM) or Common Object Request Broker Architecture (CORBA)). The objects provided may be queried in order to derive the content of a Journal document. FIG. 4 is a class diagram illustrating one possible class hierarchy 401 which may be used to produce an object model of a Journal document. Other class hierarchies may be available for Journal documents and for other proprietary binary formats.

An instance of JournalFile 402 may be used to represent a Journal document, and may include attributes including document name, version, default page width, and so forth. JournalFile 402 may include references to instances of Stationery 403, which includes information about background colors, title display, and location and style of rule lines. JournalFile 402 may also include a reference to an instance of PageList 405, which merely contains further references to one or more instances of JournalPage 406.

JournalPage 406, representing a page within a Journal document, may include a reference to an instance of Background 407, which provides images to be used in the background of a page. JournalPage 406 may also contain a reference to an instance of PageElements 408, which provides a collection of references to individual instances of JournalElement 409, or more precisely, to instances of subclasses of JournalElement 409.

Subclasses of JournalElement 409 may include InkElement 410, ImageElement 411, and TextElement 412. Each subclass may provide information about page location, transparency, and so forth. InkElement 410 may also provide information about a particular ink element such as handwriting or a drawing. This information may include recognition results and recognition alternates. ImageElement 411 may provide access to a binary representation of an image on a page, and provide other information about the image. Finally, instances of TextElement 412 may provide access to the text of a textual element on a page, and further provide information about formatting, and so forth.

Figure 5:
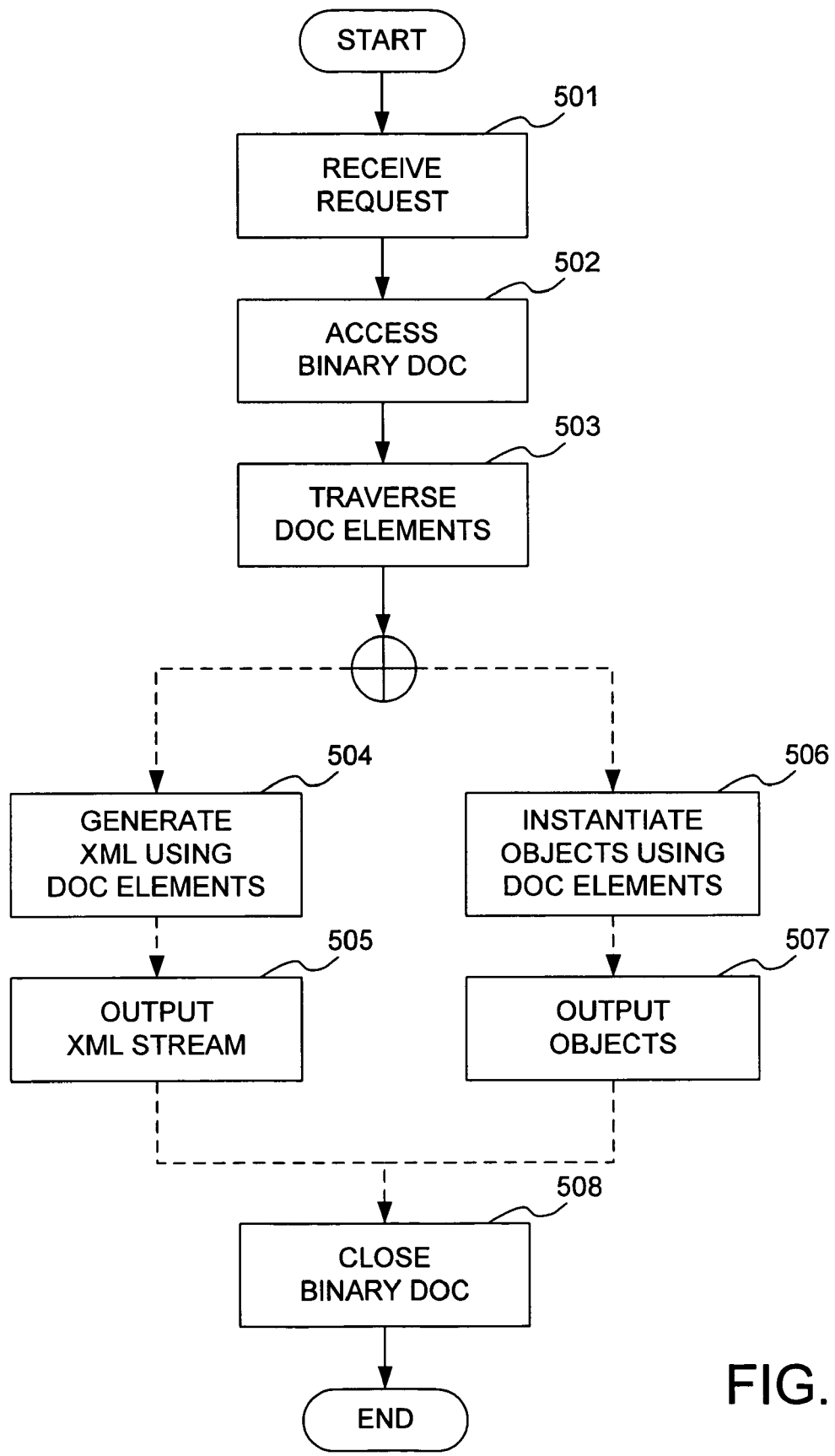
FIG. 5 is a flow diagram illustrating a process for enabling access to the contents of a Journal document in accordance with aspects of the present invention.

FIG. 5 is a flow diagram illustrating a process for enabling access to the contents of proprietary binary document 201 in accordance with aspects of the present invention. The process may be implemented by programming general-purpose computing device(s) or by designing special purpose hardware. Process steps portrayed and described herein are not intended to be either exclusive or inclusive. Other steps may be added or steps may be combined or even skipped.

At step 501, a request for access to proprietary binary document 201 is received. The document may be presently in memory, or may be stored as a file on a hard drive (e.g., TestFile.jnt). The request to access proprietary binary document 201 may come in the form of an application programming interface (API) call making the request. Such an API call may take as input a pathname or universal resource locator (URL) locating a file. Alternatively, the call may take as input a programmatic reference to the document in memory.

At step 502, proprietary binary document 201 is accessed. This may mean accessing proprietary binary document 201 in memory, or opening a file containing the document. At step 503, the contents of proprietary binary document 201 are traversed in order to create a representation of the contents and structure which is programmatically accessible. This representation may comprise an intermediate catalogue or model of proprietary binary document 201. The next step is selected based on the output format desired or implemented. Although two methods of enabling access to the contents of proprietary binary document 201 are provided herein, other methods may be available which are in keeping with the spirit of the invention.

At step 504, XML stream 202 is created using the contents of proprietary binary document 201. The XML may be assembled simultaneous to the content traversal of step 503, or it may occur after the contents have been catalogued. In generating XML tags, the placement of contents within a page may need to be adjusted for different coordinate systems. For example, coordinates may be converted from inches to himetric or twips. Also, binary data may be converted to a textual representation, such as base64.

At step 505, XML stream 202 is output. XML stream 202 may be output progressively as the contents of proprietary binary document 201 are being traversed and catalogued, or the entire stream may be delivered all at once. The output XML stream may be provided as a return value to an original API call, or alternatively it may be written to a file.

At step 506, as an alternative to step 504, an object collection is instantiated using the contents of proprietary binary document 201. As with XML, the objects may be instantiated simultaneous to the content traversal of step 503, or it may occur once the contents have been catalogued. At step 507, individual objects are generated using the contents of the proprietary binary document 201. Their attributes are set, and the relationships among the objects are also set. The output may be provided as a reference to a parent object, such as JournalFile 402, which in turn may contain references to other newly instantiated objects. Finally, at step 508, access to proprietary binary document 201 is ended. In the case of an open file, the file may be closed.

Once a user, application or software developer has accessed a model of proprietary binary document 201, they may modify or otherwise adjust the contents of the model and have the new contents converted back into the proprietary binary document. They may even be able to create new documents in this fashion. For example, an outputted XML stream may be modified to include new tags representing page elements. These new tags may then appear as elements within the proprietary binary document. Similarly, new objects could be added, or existing objects modified within the outputted object hierarchy discussed above. In this fashion, users and software applications may modify and create proprietary binary documents (e.g., Journal documents) without having to utilize the conventional (and possibly restrictive) interface associated with the proprietary format.

CONCLUSION

The present invention has been described in terms of illustrative embodiments thereof. Numerous other embodiments, modifications, and variations within the scope and spirit of the appended claims will occur to persons of ordinary skill in the art from a review of this disclosure. Although the software components and methods described above provide for accessing Journal documents, they may be utilized to enable access to other proprietary binary document formats which include non-textual data. Examples of other proprietary binary document formats which may benefit from these software components and methods include Adobe portable document format (PDF), Microsoft PowerPoint file format, word processing documents, and so forth.

We claim:

1. A method for providing information about a document, the method comprising:
   accessing, by a computing device, the document in response to a request to access the document, wherein the document is formatted using a proprietary binary format;
   traversing, by the computing device, contents within the document to create a representation of the contents and a structure of the document, wherein the contents include non-textual data and the representation includes an intermediate catalogue or model of the document,
      wherein the traversing includes analyzing electronic ink in the contents to recognize and interpret words and paragraphs within the electronic ink of the document, the interpreting including utilizing at least rules of grammar, a context of nearby words, an order of how the electronic ink was deposited on the document, a timestamp indicating when the electronic ink was deposited on the document, an indication of an author of the electronic ink, and an indication of an originating device of the electronic ink to increase accuracy of recognizing and interpreting the electronic ink;
   producing, by the computing device, an output model of the document contents in an output format different from the proprietary binary format, the output format enabling programmatic access to the contents; and
   modifying or otherwise adjusting, by the computing device, the document contents of the output model so that the document contents are converted back into a document having the proprietary binary format.

2. The method of claim 1, wherein the output format includes extensible markup language (XML).

3. The method of claim 2, wherein the output model includes textual representations of binary data.

4. The method of claim 3, wherein the textual representations of binary data include base64 encoded binary data.

5. The method of claim 2, wherein the output model includes:
   an XML tag representing the document; and
   an XML tag representing a page within the document.

6. The method of claim 1, wherein the output format includes an object interface.

7. The method of claim 1, wherein the contents further include an image of a separate document.

8. The method of claim 1, wherein the output format includes representations of binary ink data.

9. A system for providing information about a document, the system comprising:
   a memory, for storing the document, wherein the document includes a proprietary format;
   a processor, configured to:
   receive a request to provide information about the document from a requestor;
   traverse contents of the document to create a representation of the contents and a structure of the document, wherein the contents comprise non-textual data and the representation includes an intermediate catalogue or model of the document,
      wherein the traversing includes analyzing electronic ink in the contents to recognize and interpret words and paragraphs within the electronic ink of the document, the interpreting including utilizing at least rules of grammar, a context of nearby words, pen pressure, pen angle, a speed in which the electronic ink was deposited on the page, a color of the electronic ink, stylus size, and ink opacity to increase accuracy of recognizing and interpreting the electronic ink;
   develop a model of the contents;
   expose the model in a standard format to the requestor, the standard format enabling programmatic access to the contents; and
   receiving a request to modify or otherwise adjust the contents of the model so that the contents are converted back into a document having the proprietary format.

10. The system of claim 9, wherein the standard format includes extensible markup language (XML).

11. The system of claim 10, wherein the exposed model includes textual representations of binary data.

12. The system of claim 11, wherein the textual representations of binary data include base64 encoded binary data.

13. The system of claim 9, wherein the standard format includes an object interface.

14. The system of claim 13, wherein the object interface includes:
   an object representing the document; and
   one or more objects representing pages within the document.

15. A method for providing programmatic access to a Journal document, the method comprising:
   accessing, by a computing device, the Journal document, in response to a request to access the Journal document;
   traversing, by the computing device, contents of the Journal document to create a representation of the contents and a structure of the Journal document, the representation including an intermediate catalogue or model of the Journal document,
      wherein the traversing includes analyzing electronic ink in the contents to recognize and interpret words and paragraphs within the electronic ink of the Journal document, the interpreting including utilizing at least rules of grammar, a context of nearby words, an order of how the electronic ink was deposited on the document, a timestamp indicating when the electronic ink was deposited on the document, an indication of an author of the electronic ink, an indication of an originating device of the electronic ink, pen pressure, pen angle, a speed in which the electronic ink was deposited on the page, a color of the electronic ink, stylus size, and ink opacity to increase accuracy of recognizing and interpreting the electronic ink;

generating, by the computing device, a model of the contents using an accessible standard;

providing, by the computing device, access to the generated model; and modifying or otherwise adjusting, by the computing device, the contents of the model so that the contents are converted back into the Journal document.

16. The method of claim 15, wherein the accessible standard includes an XML document.

17. The method of claim 15, wherein the accessible standard includes an object interface.

* * * * *